(12) United States Patent
Kurosaki

(10) Patent No.: US 9,800,847 B2
(45) Date of Patent: Oct. 24, 2017

(54) LIGHT SOURCE UNIT INCLUDING A COLLIMATOR LENS, AND PROJECTOR INCLUDING THE LIGHT SOURCE UNIT

(71) Applicant: CASIO COMPUTER CO., LTD., Shibuya-ku, Tokyo (JP)

(72) Inventor: Hideyuki Kurosaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 152 days.

(21) Appl. No.: 14/812,185

(22) Filed: Jul. 29, 2015

(65) Prior Publication Data

US 2016/0057397 A1     Feb. 25, 2016

(30) Foreign Application Priority Data

Aug. 21, 2014     (JP) .................. 2014-168393

(51) Int. Cl.
  *G03B 21/20*     (2006.01)
  *H04N 9/31*      (2006.01)
  *G02B 27/30*     (2006.01)

(52) U.S. Cl.
  CPC ........... *H04N 9/3152* (2013.01); *G02B 27/30* (2013.01); *G03B 21/208* (2013.01); *H04N 9/3161* (2013.01); *H04N 9/3164* (2013.01); *G03B 21/204* (2013.01)

(58) Field of Classification Search
  CPC  G03B 21/208; G03B 21/2033; G03B 21/204; G03B 21/2053; H04N 9/3152; H04N 9/3161; G02B 27/30
  USPC .......................................... 353/102; 359/641
  See application file for complete search history.

(56) References Cited

U.S. PATENT DOCUMENTS

2013/0242267 A1     9/2013  Ogura et al.

FOREIGN PATENT DOCUMENTS

| CN | 103176226 A | 6/2013 |
|---|---|---|
| JP | 629135 A | 1/1987 |
| JP | 05045656 A | 2/1993 |
| JP | 2002208159 A | 7/2002 |
| JP | 2002373448 A | 12/2002 |
| JP | 2003240912 A | 8/2003 |

(Continued)

OTHER PUBLICATIONS

JP2002373448(A), Mifune, Hioyasu; Dec. 26, 2002; Machine translation in English.*

(Continued)

*Primary Examiner* — Ryan Howard
(74) *Attorney, Agent, or Firm* — Holtz, Holtz & Volek PC

(57) ABSTRACT

A light source unit includes a laser diode and a collimator lens having an entrance portion and an exit portion, with light emitted from the laser diode being incident light which is caused to enter the collimator lens. The laser diode is disposed so that a direction of a major axis of an elliptic cross section which intersects an axis of the incident light at right angles is defined as a direction of a first axis, and the entrance portion includes an elongated recess portion which is formed into a recess shape which is curved inwards towards a direction in which the incident light exits. In addition, a recessed edge of the elongated recess portion in a cross section, which intersects the first axis at right angles, is formed into an arc shape, and the incident light which enters the entrance portion is caused to exit from the exit portion.

17 Claims, 9 Drawing Sheets

(56) References Cited

FOREIGN PATENT DOCUMENTS

| | | |
|---|---|---|
| JP | 2004037826 A | 2/2004 |
| JP | 2013190591 A | 9/2013 |

OTHER PUBLICATIONS

Japanese Office Action (and English translation thereof) dated Feb. 9, 2017, issued in counterpart Japanese Application No. 2014-168393.

* cited by examiner

LIGHT SOURCE UNIT INCLUDING A COLLIMATOR LENS, AND PROJECTOR INCLUDING THE LIGHT SOURCE UNIT

CROSS-REFERENCE TO RELATED APPLICATION

This patent application is based upon and claims the benefit of priority under 35 USC 119 from the prior Japanese Patent Application No. 2014-168393 filed on Aug. 21, 2014, the entire disclosure of which, including the description, claims, drawings and abstract, is incorporated herein by reference.

BACKGROUND OF THE INVENTION

Field of the Invention

The present invention relates to, a light source unit including a collimator lens, and a projector including the light source unit.

Description of the Related Art

In these days, data projectors are used on many occasions as an image projection system which projects an image of a screen or a video image of a personal computer, as well as images based on image data which is stored on a memory card or the like on to a screen. Conventionally, the mainstream of these projectors has been those which utilize a high-intensity discharge lamp as a light source. In recent years, however, there have been made many proposals of projectors using laser diodes which can save electric power, which have long service life and which are highly bright.

A projector disclosed in the Japanese Unexamined Patent Publication No. 2013-190591 includes as light sources a blue laser emitter which emits light in the blue wavelength range, a red laser emitter which emits light in the red wavelength range, and a luminescent light emitting device which emits light in the green wavelength range as a result of excitation light being shone on to a luminescent material layer thereof. Laser rays emitted from the laser emitters are shone on to a microlens array via collimator lenses, whereby the laser rays are guided to a display device as diffuse light rays of a uniform light intensity distribution. Similarly, the luminescent light from the luminescent light emitting device is also guided to the display device via the same microlens array.

It is known that light emitted from a laser diode takes an elliptic cross-sectional shape. The Japanese Unexamined Utility Model Publication No. 5-45656 discloses a light source unit in which a cross-sectional shape of light emitted from a laser diode and collimated by a collimator lens is shaped into a circular shape through the use of two cylindrical lenses whose axial directions are made to coincide with each other.

In the projector disclosed in the Japanese Unexamined Patent Publication No. 2013-190591, the light emitted from the laser diode and the luminescent light from the luminescent light emitting device pass through the same microlens array. In general, light emitted from a laser diode has strong directionality and is shone over a narrow range.

Because of this, when a laser ray is incident on a microlens array which is adjusted to an incident range of light in the green wavelength range which is luminescent light, the laser ray is shone on to a small number of microlenses, which sometimes results in a case where the intensity is not uniformed sufficiently.

When small microlenses are used for such a microlens array in order to enhance the uniformity in intensity distribution of a laser ray, the loss of transmitted light is increased by connecting portions where the small microlenses are connected to one another, resulting in a reduction in light utilization efficiency.

On the other hand, when the number of microlenses through which a laser ray passes is attempted to be increased by expanding the shining range of the laser ray with a collimator lens, the collimator lens needs to take in portions of the laser ray which expand along a major axis of the elliptic cross-sectional shape, and therefore, a large collimator lens needs to be used, which eventually calls for an enlargement in size of the projector.

In addition, even though an application does not require a laser ray to be circular in cross section at an exit surface of the collimator lens or an application does not require that the laser lay is collimated accurately, in case an angle of emission of the laser ray is not uniform with respect to an optical axis of a collimator lens (namely, the laser ray is expanded in a elliptic shape), there may occur an unfavorable case for a post utilization of the laser ray.

SUMMARY OF THE INVENTION

Thus, the invention has been made in view of these situations, and an object thereof is to provide a light source unit having a collimator lens which can make uniform an emission angle of a laser ray with respect to an optical axis while expanding a shining range of the laser ray, and a projector including the light source unit.

According to an aspect of the invention, there is provided a light source unit including:

a laser diode which emits light having an elliptic cross section; a collimator lens having an entrance portion and an exit portion; wherein the light emitted from the laser diode is defined as incident light which is caused to enter the collimator lens, and the laser diode is disposed so that a direction of a major axis of the elliptic cross section which intersects an axis of the incident light at right angles is defined as a direction of a first axis, the entrance portion includes an elongated recess portion which is formed into a recess shape which is curved inwards towards a direction in which the incident light exits, and a recessed edge of the elongated recess portion in a cross section, which intersects the first axis at right angles, is formed into an arc shape, and wherein the incident light which enters the entrance portion is caused to exit from the exit portion which is formed into a convex shape.

In addition, according to a second aspect of the invention, there is provided a projector including:

the light source unit set forth in the first aspect;
a display device on to which light source light from the light source unit is shone to form image light;
a projection side optical system which projects the image light emitted from the display device on to a screen; and
a projector control unit which controls the display device and the light source unit.

DETAILED DESCRIPTION OF THE PREFERRED EMBODIMENTS

First Embodiment

Figure 1:
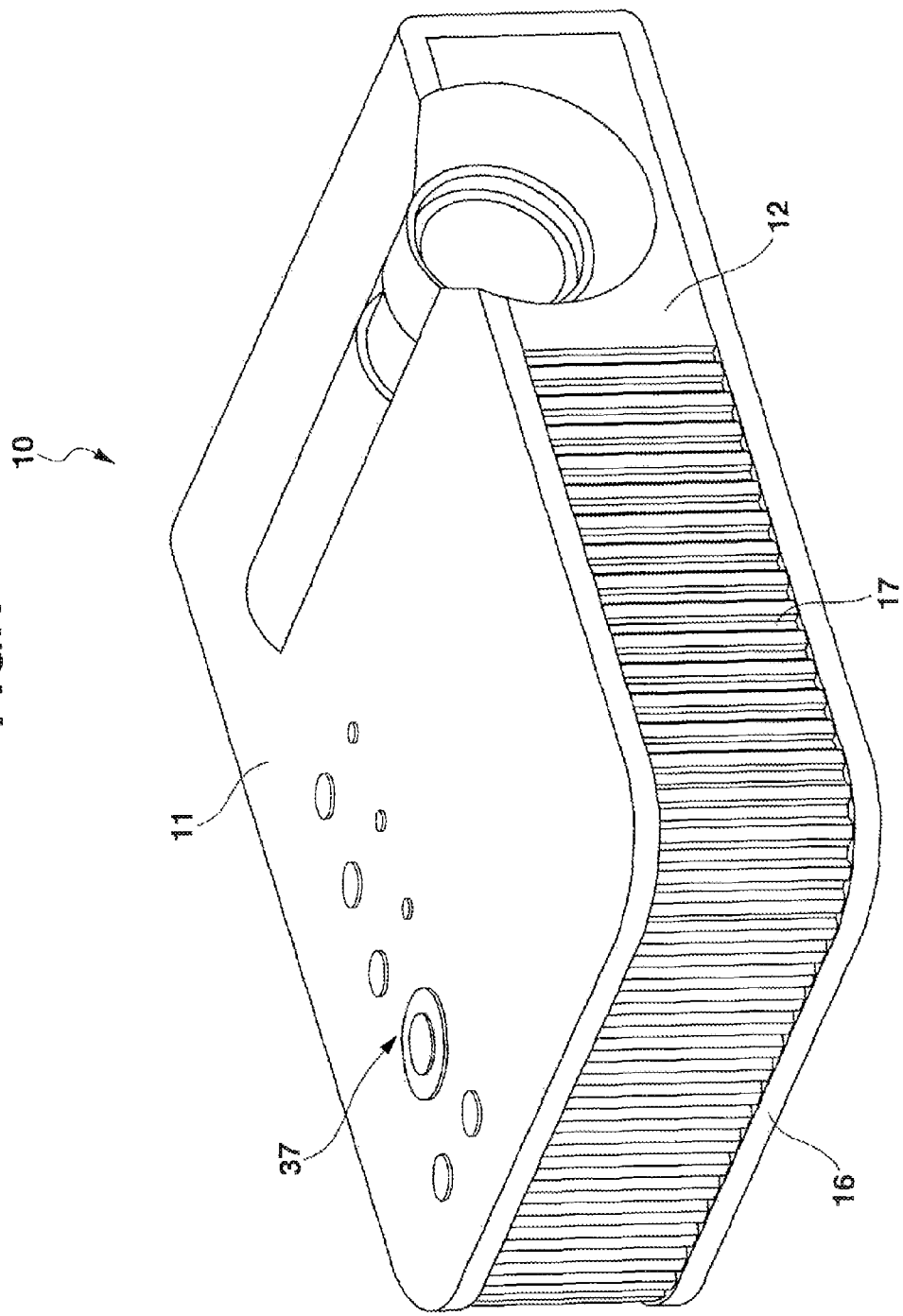
FIG. 1 is an external perspective view showing a projector according to an embodiment of the invention.

Hereinafter, a first embodiment of the invention will be described based on FIGS. 1 to 7. FIG. 1 is an external perspective view of a projector 10. In this embodiment, when left and right are referred to in relation to the projector 10, they denote, respectively, left and right with respect to a projecting direction, and when front and rear are referred to in relation to the projector 10, they denote, respectively, front and rear with respect to a direction towards a screen from the projector 10 and a traveling direction of a pencil of light emitted from the projector 10.

As shown in FIG. 1, the projector 10 has a substantially rectangular parallelepiped shape. The projector 10 has a projecting portion to aside of a front panel 12 that is a front side panel of a casing of the projector 10. A plurality of inside air outlet ports 17 are provided in the front panel 12. Further, although not shown, the projector 10 has an Ir reception unit which receives a control signal from a remote controller.

In addition, a keys/indicators unit 37 is provided on an upper case 11 of the casing. Disposed on this keys/indicators unit 37 are keys and indicators which include a power indicator, a projection switch key, an overheat indicator, and the like. The power indicator informs whether a power switch key or a power supply is on or off. The projection switch key switches on or off the projection of the projector 10. The overheat indicator informs of an overheat condition occurring in a light source unit, a display device, a control circuit or the like when they really overheat. Additionally, the upper case 11 covers the casing of the projector 10 from an upper surface to part of a left side surface thereof, so that the upper case 11 is made to be removed from a lower case 16 in the event the projector 10 fails.

Further, an input/output connector unit where USB terminals, an image signal input D-SUB terminal where an analog RGB image signal is inputted, an S terminal, an RCA terminal, a voice output terminal and the like are provided and various types of terminals including a power supply adaptor plug are provided on a back panel, not shown, at the rear of the casing. Additionally, a plurality of outside air inlet ports are formed in the back panel.

Figure 2:
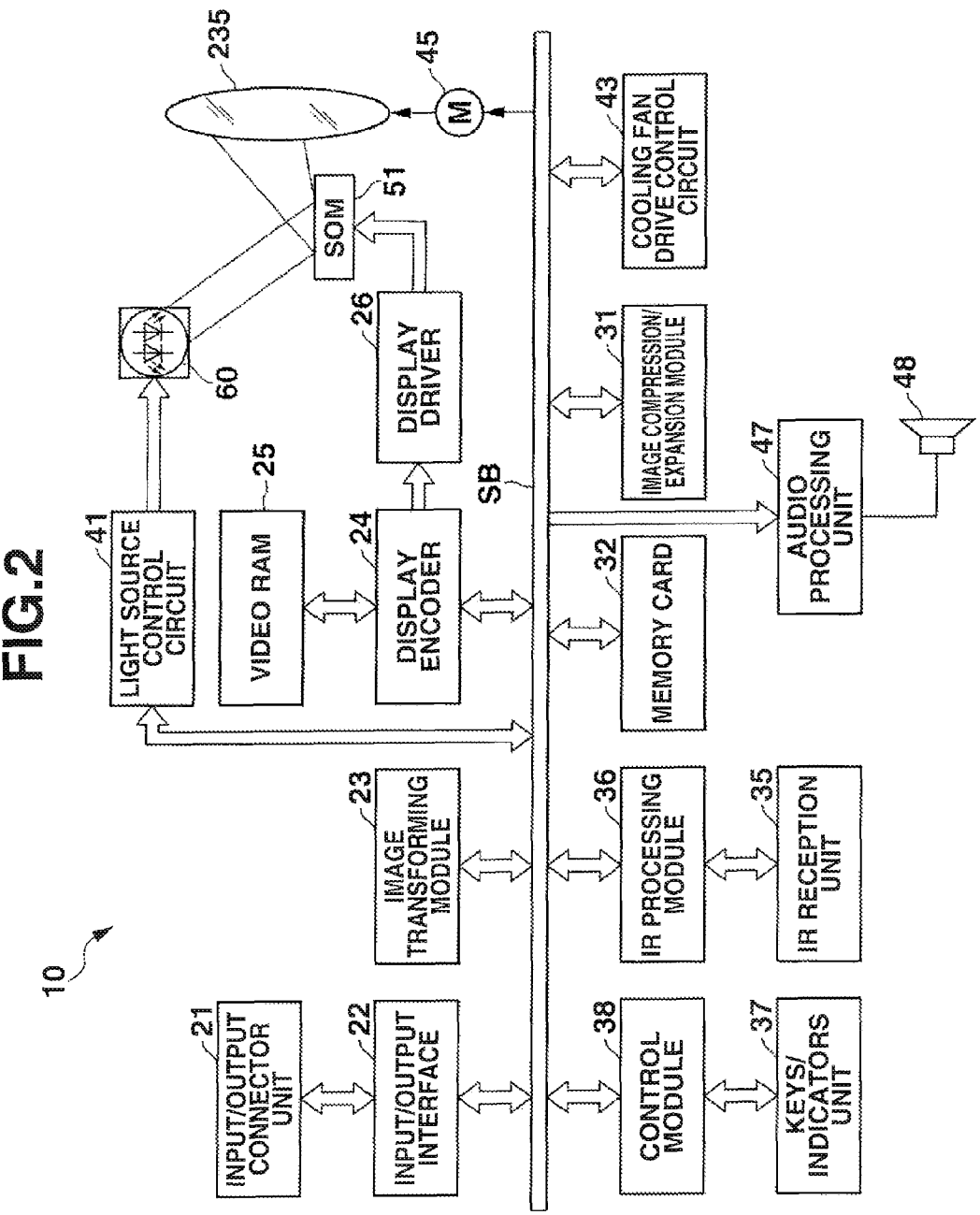
FIG. 2 is a functional block diagram of the projector according to the embodiment of the invention.

Next, a projector control unit of the projector 10 will be described through the use of a functional block diagram shown in FIG. 2. The projector control unit includes a control module 38, an input/output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to an output of an image signal from the display encoder 24.

In this projector 10, a pencil of light that is emitted from a light source unit 60 is shone on to the display device 51 via an optical system, whereby an optical image is formed by using reflected light reflected by the display device 51. The image so formed is then projected on to a screen, not shown, for display thereon via a projection side optical system. A movable lens group 235 of the projection side optical system is driven by a lens motor 45 for zooming or focusing.

An image compression/expansion module 31 performs a recording process of data compressing a brightness signal and a color difference signal of the image signal to be sequentially written on a memory card 32 that is a detachable recording medium through operations using ADCT and the Huffman method.

Further, when in a reproducing mode, the image compression/expansion module 31 reads out the image data recorded on the memory card 32 and expands individual image data that make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 that includes the main keys and indicators that are provided on the upper case 11 of the casing are sent out directly to the control module 38. Key operation signals from the remote controller are received by the Ir reception unit 35, and code signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls separately and individually the emission of lights in the red, green and blue wavelength ranges from red light source device, green light source device and blue light source device of the light source unit 60 so that the lights in the predetermined wavelength ranges which are required when an image is generated are emitted from the light source unit 60.

Further, the control module 38 causes a cooling fan drive control circuit 43 to detect temperatures through a plurality of temperature sensors which are provided in the light source unit 60 and the like so as to control the rotating speeds of cooling fans based on the results of the temperature detections. The control module 38 also controls the cooling fan drive control circuit 43 so that the cooling fans continue to rotate even after the power supply to the projector 10 itself is turned off through a timer or the power supply to the projector 10 itself is turned off depending upon the results of the temperature detections by the temperature sensors.

Figure 3:
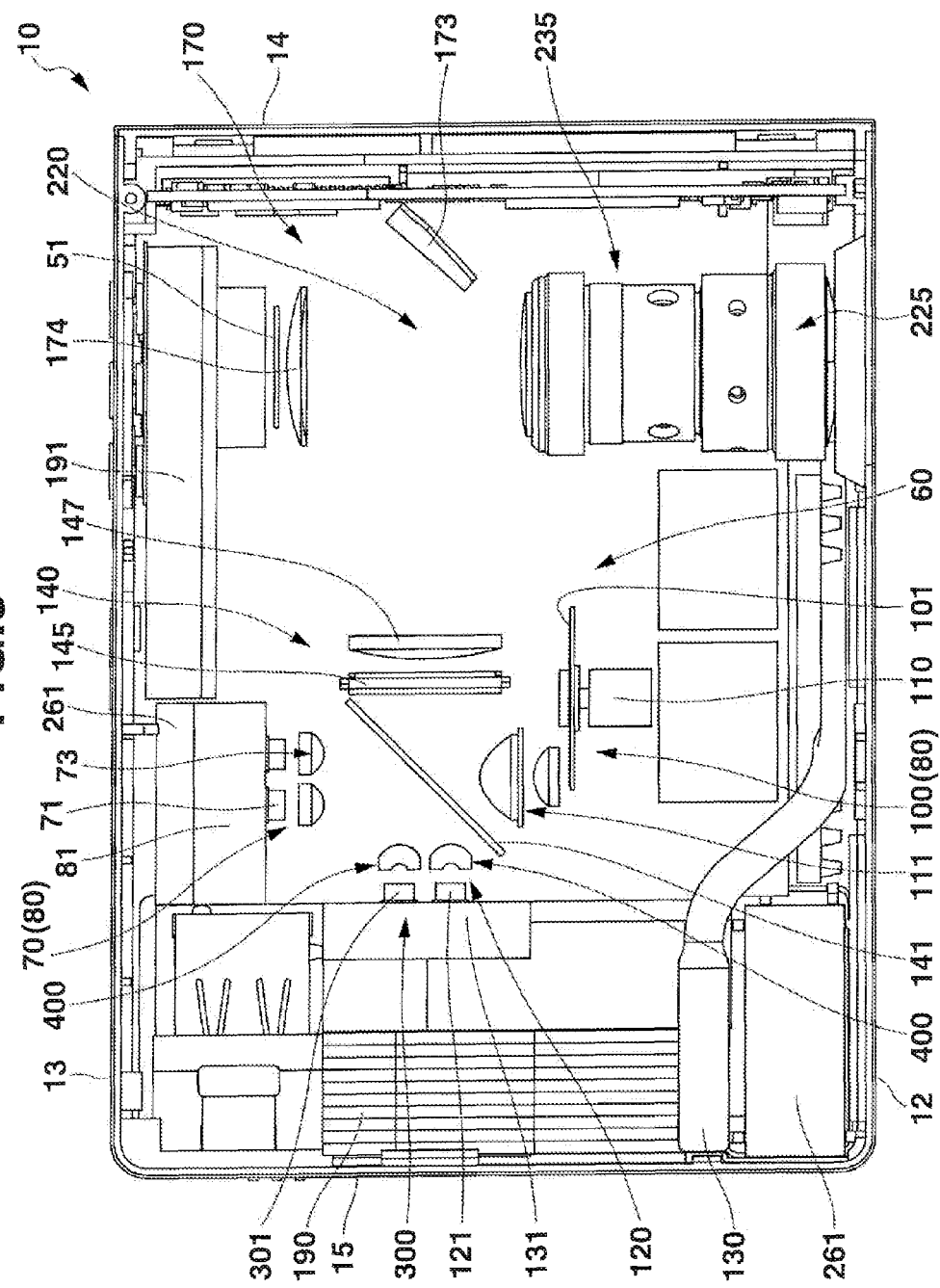
FIG. 3 is a schematic plan view showing an internal construction of the projector according to the embodiment of the invention.

Next, an internal construction of the projector 10 will be described. FIG. 3 is a schematic plan view showing the internal construction of the projector 10. The projector 10 includes the light source unit 60 at a central portion and a lens barrel 225 of the projection side optical system 220 to the left of the light source unit 60. Additionally, the projector 10 includes the display device 51, which is made up of a DMD (Digital Micromirror Device) or the like, between the lens barrel 225 and the back panel 13. The projector 10 includes a heat sink 191 for cooling the display device 51 between the display device 51 and the back panel 13. Further, the projector 10 includes a main control circuit board below the light source unit 60.

The light source unit 60 is formed of a green light source device 80 that emits light in the green wavelength range, a red light source device 120 that emits light in the red wavelength range, a blue light source device 300 that emits light in the blue wavelength range, and a light guiding optical system 140.

The blue light source device 300 and the red light source device 120 are disposed so that axes of lights emitted from the individual light source devices each intersect an axis of excitation light emitted from an excitation light shining device 70 and an axis of luminescent light emitted from a luminescent light emitting device 100 that is the green light source device 80 at right angles.

The red light source device 120 and the blue light source device 300 are disposed so as to be aligned back and forth with the red light source device 120 disposed forwards in relation to a front-to-rear direction of the projector 10. The red light source device 120 is formed of one red laser diode 121 and a collimator lens 400 which is disposed on an optical axis of the red laser diode 121. Similarly, the blue light source device 300 is formed of one blue laser diode 301 and a collimator lens 400 which is disposed on an optical axis of the blue laser diode 301. The red laser diode 121 and the blue laser diode 301 are both disposed so that laser rays are emitted therefrom towards a left panel 14.

Laser rays which are emitted individually from the red laser diode 121 and the blue laser diode 301 are shaped so that an elliptic cross section of each laser ray is formed into a circular one and are collimated to be converted into a parallel beam by the corresponding collimator lenses 400. The collimator lenses 400 will be described in detail later.

Heat sinks 131, 190 are provided between the light source unit 60 and a right panel 15 to cool the red laser diode 121 of the red light source device 120 and the blue laser diode 301 of the blue light source device 300.

A cooling fan 261 is disposed between the head sinks 131, 190 and the front panel 12. The cooling fan 261 sucks a cooling medium which is warmed up by the heat sinks 131, 190 thereinto and discharges the warmed up medium to the outside of the projector 10.

The green light source device 80 is formed of the excitation light shining device 70 which is disposed at a substantially central portion of the casing of the projector 10 in relation to a left-to-right direction thereof and the luminescent light emitting device 100 which is disposed on an axis of a pencil of light which is emitted from the excitation light shining device 70 and near the front panel 12.

The excitation light shining device 70, which is an excitation light source, is made up of two blue laser diodes 71. The two blue laser diodes 71 are disposed so as to be aligned side by side in the left-to-right direction so that optical axes thereof are at right angles to the back panel 13. A heat sink 81 is disposed between the blue laser diodes 71 and the back panel 13. Collimator lenses 73, which are collective lenses, are disposed individually on the optical axes of the corresponding blue laser diodes, and these collimator lenses 73 convert light emitted from each blue laser diode 71 into a parallel beam.

A cooling fan 261 is disposed between the heat sink 81 and the back panel 13, and this cooling fan 261 is a blowing fan to send outside air as a cooling medium towards the heat sink 81. The blue laser diodes 71 are cooled by the cooling fan 261 and the heat sink 81.

The luminescent light emitting device 100 of the green light source device 80 includes a luminescent wheel 101, which is made into a luminescent plate, a wheel motor 110 and a group of collective lenses 111. The luminescent wheel 101, which is the luminescent plate, is disposed so as to be parallel to the front panel 12 or so as to be at right angles to the axis of light emitted from the excitation light shining device 70. The wheel motor 110 drives to rotate the luminescent wheel 101. The collective lens group 111 collects pencils of light which are emitted from the luminescent wheel 101 in the direction of the back panel 13. A heat sink 130 and the like are disposed between the wheel motor 110 and the front panel 12 to thereby cool the luminescent wheel 101.

The luminescent wheel 101, which is the luminescent plate, is a disc-shaped metallic base and has an annular luminescent light emitting area which emits luminescent light in the green wavelength range through the use of lights emitted from the blue laser diodes 71 as excitation light. This luminescent light emitting area is formed by providing in a recess, which is formed in the metallic base, a luminescent material layer which receives excitation light to emit luminescent light. A reflecting surface which reflects light is formed on a surface of a side of the luminescent wheel 101 which includes the luminescent light emitting area and faces the blue laser diodes 71 through mirror finishing by silver deposition or the like. Then, a green luminescent material layer is laid out on the reflecting surface.

Light emitted from the excitation light shining device 70 to be shone on to the green luminescent material layer of the luminescent wheel 101 excites a green luminescent material in the green luminescent material layer. Then, pencils of luminescent light emitted in all directions from the green luminescent material are directed directly towards the blue laser diodes 71 or are reflected on the reflecting surface of the luminescent wheel 101 to be directed towards the blue laser diodes 71.

Additionally, excitation light which is shone on to the metallic base without being absorbed by the luminescent material in the luminescent material layer is reflected by the reflecting surface and enters the luminescent material layer again to excite the luminescent material. Thus, the utilization efficiency of excitation light emitted from the excitation light shining device 70 can be enhanced by making the surface of the recess portion of the luminescent wheel 101 into the reflecting surface, thereby making it possible to emit bright luminescent light.

A dichroic mirror 141 is disposed in a position where axes of light in the red wavelength range which is emitted from the red light source device 120 and light in the blue wavelength range which is emitted from the blue light source device 300 intersect axes of light in the blue wavelength range which is emitted from the excitation light shining device 70 and light in the green wavelength range which is emitted from the green light source device 80 at right angles. The dichroic mirror 141 transmits light in the red wavelength range and light in the blue wavelength range and reflects light in the green wavelength range so that the axis of the green light is turned by 90 degrees in the direction of the left panel 14. Consequently, light in the red wavelength range, light in the green wavelength range and light in the blue wavelength range can be superposed on the same optical path by the single dichroic mirror 141.

A microlens array 145 is disposed to the left of the dichroic mirror 141. The microlens array 145 not only diffuses lights in the red, green and blue wavelength ranges but also superposes the lights which have passed therethrough one on another to distribute uniformly the intensities of the lights in the red, green and blue wavelength ranges.

Each of microscopic lenses of the microlens array 145 is a biconvex lens which has a horizontally elongated rectangular shape when seen from thereabove, and these microscopic lenses are arranged into a lattice configuration. A collective lens 147 is disposed on aside of the microlens array 145 which faces the left panel 14. The collective lens 147 collects the lights which are diffused and uniform in intensity as a result of having passed through the microlens array 145 so as to match an effective size of the display device 51. The light guiding optical system 140 is made up of the dichroic mirror 141, the microlens array 145 and the collective lens 147.

Additionally, a light axis changing mirror 173 and a condenser lens 174 are provided as a light source side optical system 170. It is noted that since the condenser lens 174 collects light emitted from the display device 51 to cause it to enter the lens barrel 225, the condenser lens 174 is also regarded as constituting one of the constituent elements of the projection side optical system 220.

Light emitted from the light source unit 60 is made into light whose intensity is distributed uniformly by the microlens array 145, which is then emitted to the light axis changing mirror 173 via the collective lens 147. On the other hand, the condenser lens 174 is provided in front of the display device 51. Thus, the light emitted from the light source unit 60 and reflected by the light axis changing mirror 173 is shone on to the display device 51 effectively by the condenser lens 174.

"On" light which is reflected by the display device 51 is emitted on to a screen by the projection side optical system 220 as projection light. The lens barrel 225 of this projection side optical system 220 includes a fixed lens group and the movable lens group 235 which are incorporated in the lens barrel 225 and is made into a variable-focus lens equipped with a zooming function. The movable lens group 235 can perform zooming and focusing through the use of the lens motor as a drive source.

By configuring the projector 10 in the way described heretofore, when light is emitted from each of the excitation light shining device 70, the red light source device 120 and the blue light source device 300 at different timings while the luminescent wheel 101 is rotated, light in the red wavelength range, light in the green wavelength range and light in the blue wavelength range are allowed to enter the display device 51 via the light guiding optical system 140 and the light source side optical 170. Then, the DMD which is the display device 51 of the projector 10 displays images based on the red, green and blue lights according to data in a time sharing fashion, thereby making it possible to project a color image on to the screen.

Figure 4:
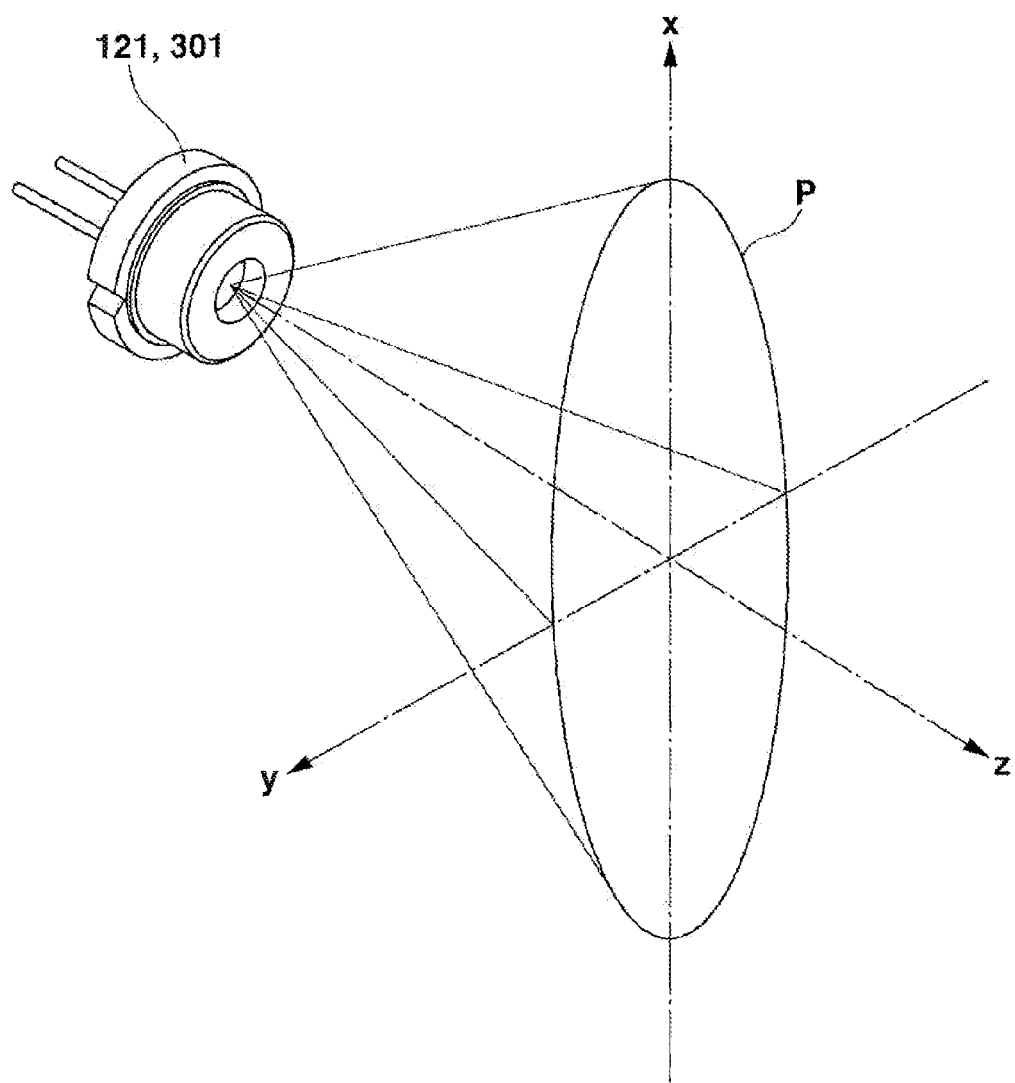
FIG. 4 is a perspective view showing a state that a laser diode according to the first embodiment is emitting light.

Here, in the laser diodes (the red laser diode 121 and the blue laser diode 301) which are provided in the light source unit 60, an emission angle of a laser beam relative to a cementing plane of each diode differs between a vertical direction and a horizontal direction. Because of this, it is known that as shown in FIG. 4, a cross section of a laser ray which is emitted from a laser diode takes an elliptic shape. Here, for the sake of the following description, in an elliptic cross-sectional shape P of light emitted from each of the red laser diode 121 and the blue laser diode 301, a major axis direction is defined as an x axis (a first axis) and a minor axis direction is defined as a y axis (a second axis), and an axis of a laser ray is defined as a z axis.

According to the definitions of the axes made above, FIG. 3 shows the arrangement of the constituent elements of the projector 10 on a y-z plane. The red laser diode 121 and the blue laser diode 301 are disposed so that in the elliptic cross-sectional shape P of the laser ray emitted from each of the laser diodes 121, 301, the major axis direction (the x axis direction) becomes vertical to a surface of a sheet of paper on which FIG. 3 is drawn. The following description will be made based on the x-y-z axis system so as to match the arrangement of the laser diodes 121, 301 shown in FIG. 3.

Figure 5A:
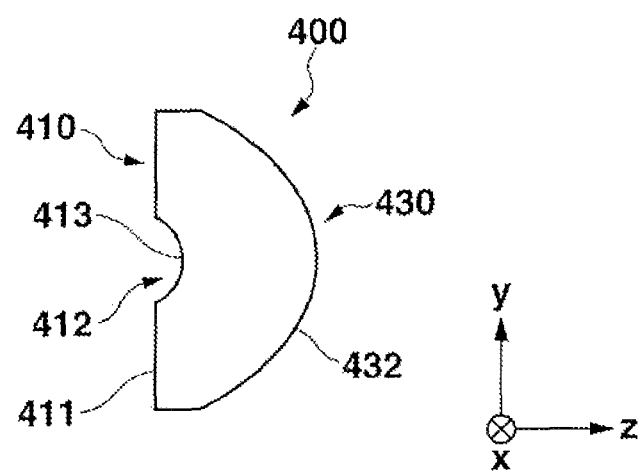
FIG. 5A is a side view of a collimator lens according to the first embodiment of the invention along a y-z plane.
Figure 5B:
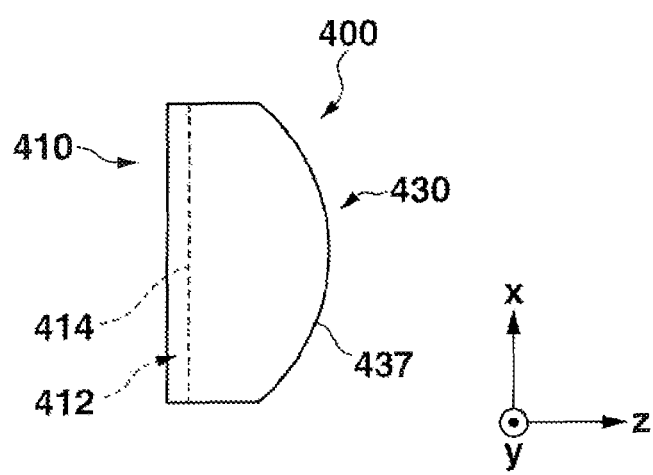
FIG. 5B is a side view of the collimator lens according to the first embodiment of the invention along an x-z plane.
Figure 5C:
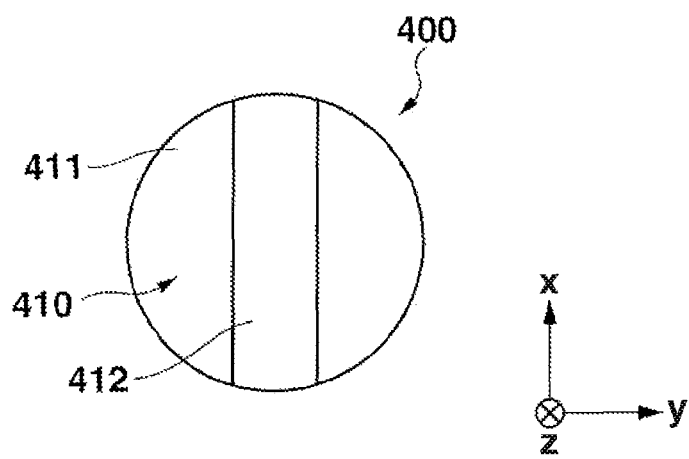
FIG. 5C is a rear view of the collimator lens according to the first embodiment of the invention along a x-y plane.

FIG. 5A is a side view of the collimator lens 400 along the y-z plane. FIG. 5B is a side view of the collimator lens 400 along the x-z plane. FIG. 5C is a rear view of the collimator lens 400 along the x-y plane. As shown in FIG. 5C, the collimator lens 400 has a circular external shape. The collimator lens 400 has an entrance portion 410 where incident light which is a laser ray is caused to enter, and this entrance portion 410 is formed at a left-hand side of the collimator lens 400 as seen in FIG. 5A. The collimator lens 400 has an exit portion 430 where the incident light which has entered the entrance portion 410 is caused to exit, and this exit portion 430 is formed at a right-hand side of the collimator lens 400 as seen in FIG. 5A.

An outer surface of the entrance portion 410 is formed into a flat surface 411. An elongated recess portion 412 is formed at a central portion of the flat surface 411, and in the elongated recess portion 412, the direction of the x axis which intersects the z axis which is the axis of incident light at right angles is referred to or defined as a longitudinal direction. The elongated recess portion 412 is curved inwards from the flat surface 411 to a rightward direction in FIG. 5A which is a direction in which incident light exits from the collimator lens 400. Additionally, a recessed edge 413 in a cross section which intersects the x axis at right angles is formed into an arc-like shape. A radius of this recessed edge 413 is smaller than a distance between an exit surface which is a distal end of the laser diode (the red laser diode 121, the blue laser diode 301) and the flat surface 411 of the collimator lens 400 (refer to FIG. 6A). Additionally, as shown in FIG. 5B, a recessed edge 414 in a cross section which is at right angles to the y axis is formed into a straight line. In other words, the elongated recess portion 412 is formed as a cylindrical recess portion.

When looking at the collimator lens 400 from a side thereof, that is, as shown in FIGS. 5A and 5B, the exit portion 430 is formed into a convex lens which is made convex to the rightward direction which is the exiting direction of incident light. Additionally, the exit portion 430 is formed so that a curvature of an arc-shaped edge portion 432 which is an edge portion which is formed into an arc shape in a cross section which is at right angles to the x axis shown in FIG. 5A differs from a curvature of an arc-shaped edge portion 437 which is an edge portion which is formed into an arc shape in a cross section which is at right angles to the y axis which is shown in FIG. 5B as intersecting the x axis at right angles. In other words, the exit portion 430 is formed as an aspheric lens. The portion of the exit portion 430 which is formed as the aspheric lens is formed so that light exiting from the exit portion 430 constitutes a parallel beam. In this embodiment, the arc-shaped edge portion 432 is formed so that the curvature thereof becomes greater than the curvature of the arc-shaped edge portion 437.

Figure 6A:
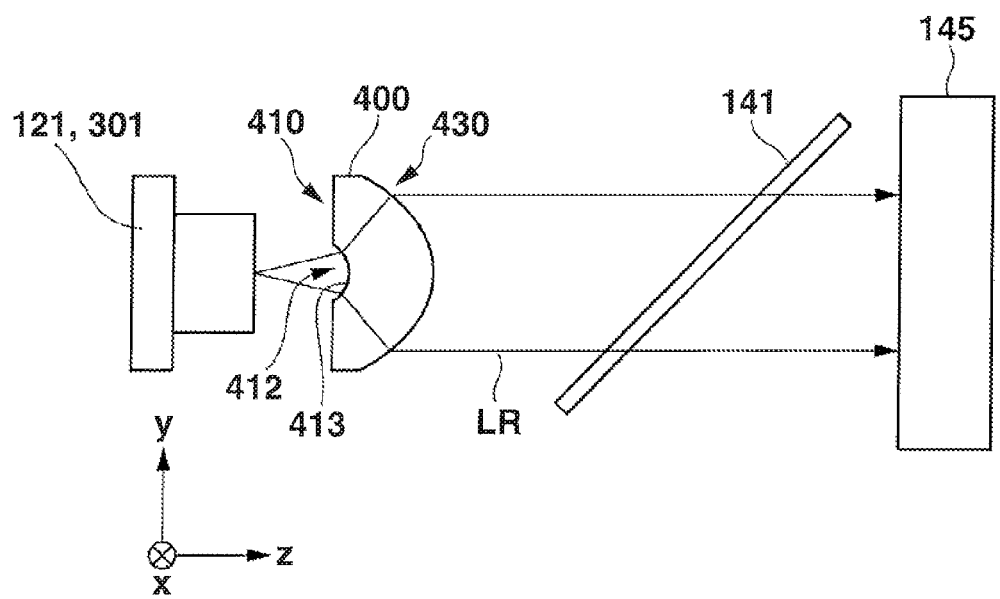
FIG. 6A is a schematic side view along the y-z plane of the laser diode, the collimator lens and other constituent elements according to the first embodiment of the invention which shows how light emitted from the laser diode is transmitted through the collimator lens.
Figure 6B:
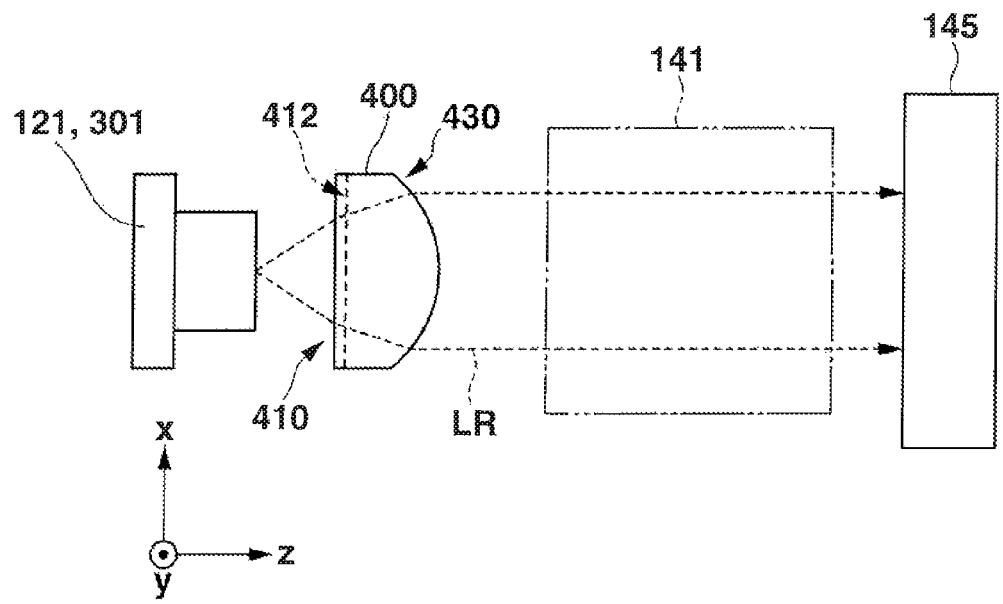
FIG. 6B is a schematic side view along the x-z plane of the laser diode, the collimator lens and the other constituent elements of the first embodiment of the invention which shows how the light emitted from the laser diode is transmitted through the collimator lens.

Next, based on FIG. 6, how a laser ray which exits from each laser diode passes through the collimator lens 400 will be described. FIG. 6A shows the y-z plane, and FIG. 6B shows the x-z plane. As shown in FIGS. 6A and 6B, a laser ray LR which is light emitted from the laser diode (the red laser diode 121, the blue laser diode 301) is caused to enter the elongated recess portion 412 of the entrance portion 410 so that the direction of the major axis (the direction of the x axis) of the elliptic cross-sectional shape P coincides with the longitudinal direction of the elongated recess portion 412 of the collimator lens 400.

Consequently, as shown in FIG. 6A, the direction of the minor axis (the direction of the y axis) of the elliptic cross section P of the laser ray LR which is the light emitted from the laser diode (the red laser diode 121, the blue laser diode 301) is expanded in width by the recessed edge 413 of the elongated recess portion 412. As this occurs, the width of the laser ray LR in the direction of the y axis is expanded so as to be equal to a width of the laser ray LR in the direction of the x axis at the exit portion 430. On the other hand, as shown in FIG. 6B, the width of the laser ray LR in the direction of the x axis is not expanded by the elongated recess portion 412 but is only expanded according to the refractive index of a material of the collimator lens 400.

The laser ray LR which exits from the exit portion 430 of the collimator lens 400 is emitted as a parallel beam by the convex lens portion which is formed as the aspheric lens. The laser ray LR having exited from the exit portion 430 passes through the dichroic mirror 141 and is then shone on to the microlens array 145.

Figure 7:
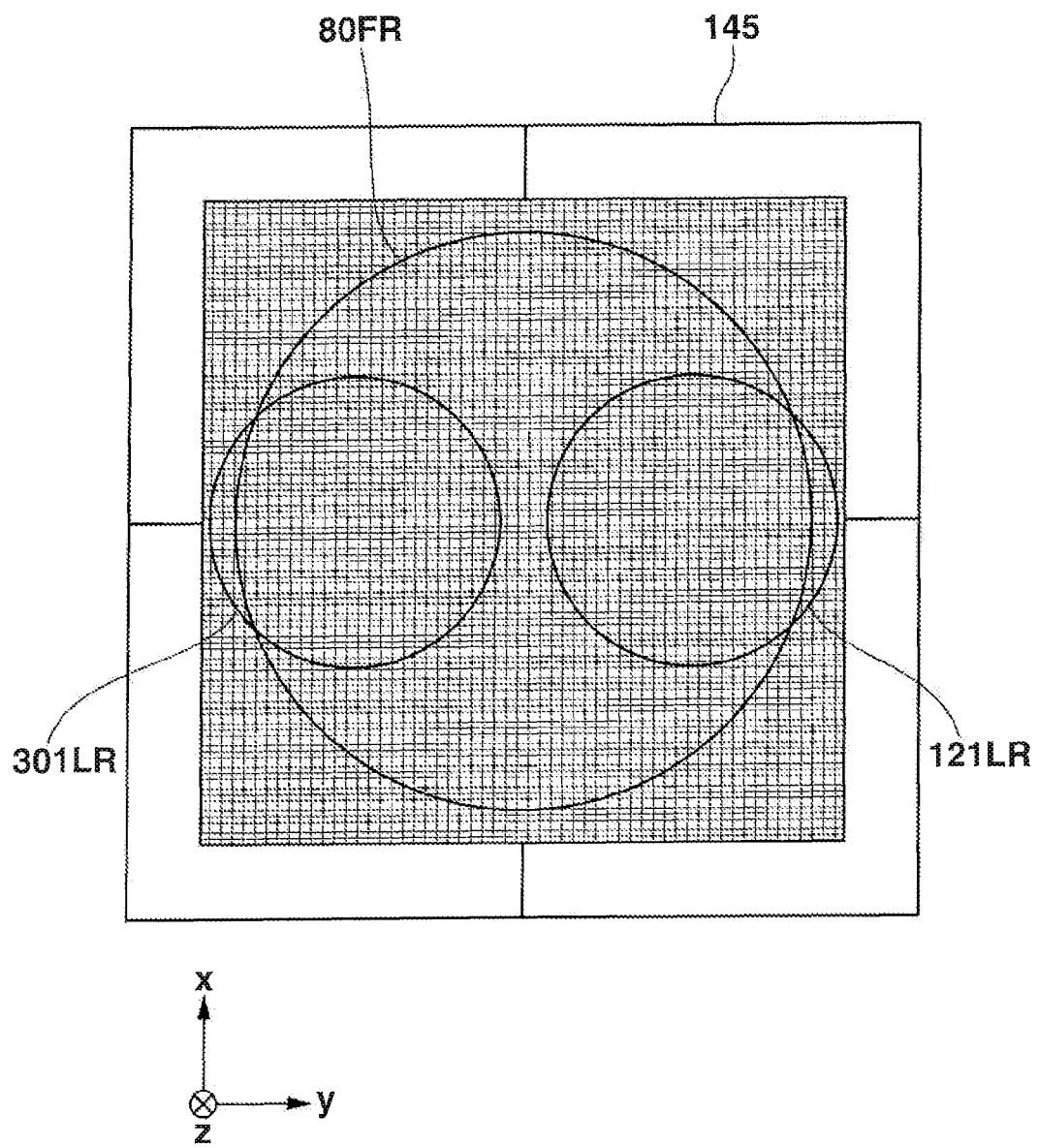
FIG. 7 is a schematic plan view of a microlens array according to the first embodiment of the invention which shows how light enters the microlens array.

FIG. 7 shows how laser rays which are emitted from the laser diodes are shone on to the microlens array 145. It is noted that FIG. 7 represents the microlens array 145 on the x-y plane. As shown in FIG. 7, laser rays which are emitted from the red laser diode 121 and the blue laser diode 301 are shone on to the microlens array 145 as laser rays 121LR and 301LR which are parallel beams each shaped into a circular cross section by the corresponding collimator lens 400. Additionally, luminescent light from the green light source device 80 is shone on to the microlens array 145 as luminescent light or a fluorescent ray 80FR having a circular cross section.

In this way, the laser rays from the laser diodes are shone onto the microlens array 145 while the elliptic cross sections of the laser rays are shaped into the circular cross sections by the corresponding collimator lenses 400, and therefore, compared with a case where laser rays having elliptic cross sections which are equal in width in the direction of the x axis and are shorter in width in the direction of the y axis are shone on to the microlens arrays 145 through normal collimator lenses, the number of microscopic lenses (the number of cells) which the laser rays are caused to enter can be increased.

In this embodiment, while the exit portion 430 is formed so that the laser ray LR which is caused to exit from the exit portion 430 which is formed as the aspheric lens is converted into the parallel beam, the exit portion 430 can also be formed so that the laser ray LR is allowed to exit while spreading at spreading angles of the order of several degrees both in the direction of the x axis and the direction of the y axis. Additionally, the exit portion 430 is formed so that the angles at which the laser ray is caused to exit from the exit portion 430 in the direction of the x axis and the direction of the y axis are the same.

Second Embodiment

Next, referring to FIGS. 8A, 8B and 8C, a second embodiment of the invention will be described. In the second embodiment, the collimator lens 400 in the first embodiment is modified into a collimator lens 500 shown in FIGS. 8A, 8B, 8C. Consequently, the other features of the second embodiment else than the collimator lens 500 are the same as those of the first embodiment, and therefore, the description thereof will be omitted here.

Figure 8A:
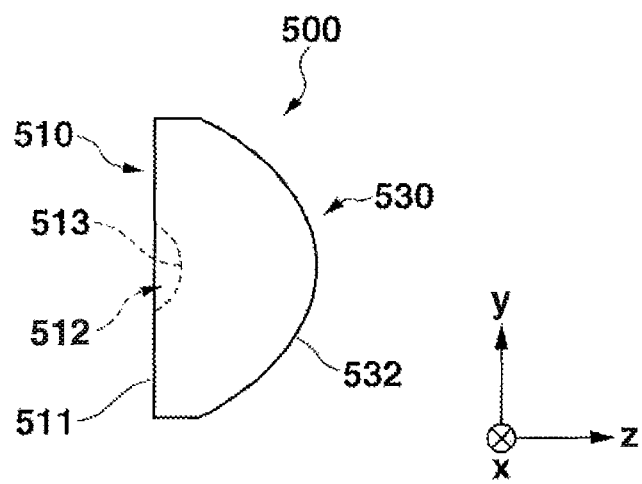
FIG. 8A is a side view of a collimator lens according to a second embodiment of the invention along a y-z plane.
Figure 8B:
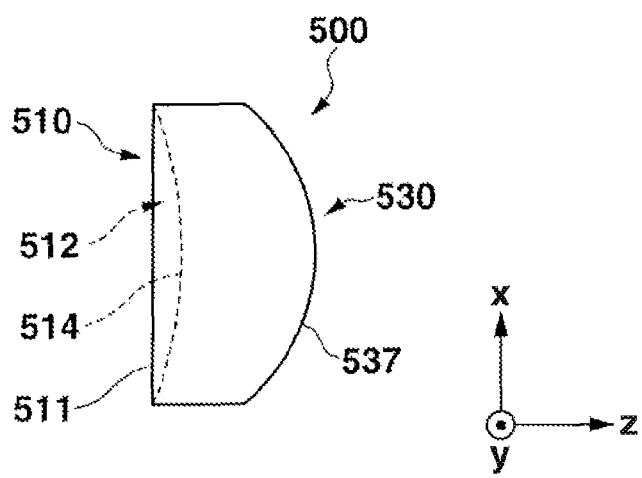
FIG. 8B is a side view of the collimator lens according to the second embodiment of the invention along an x-z plane.
Figure 8C:
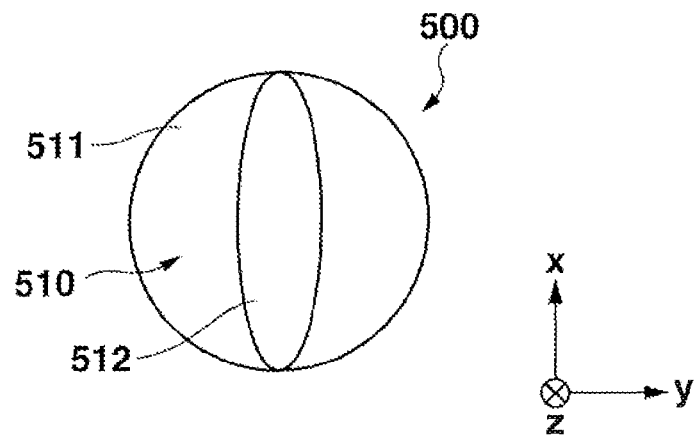
FIG. 8C is a rear view of the collimator lens according to the second embodiment of the invention along an x-y plane.

FIG. 8A is a side view of the collimator lens 500 along a y-z plane. FIG. 8B is a side view of the collimator lens 500 along an x-z plane. FIG. 8C is a rear view of the collimator lens 500 along an x-y plane. As shown in FIG. 8C, the collimator lens 500 has a circular external shape. The collimator lens 500 has an entrance portion 510 where incident light which is a laser ray is caused to enter, and this entrance portion 510 is formed at a left-hand side of the collimator lens 500 as seen in FIG. 8A. The collimator lens 500 has an exit portion 530 where the incident light which has entered the entrance portion 510 is caused to exit, and this exit portion 530 is formed at a right-hand side of the collimator lens 500 as seen in FIG. 8A.

A surface of aside of the entrance portion 510 from which light enters is formed into a flat surface 511. An elongated recess portion 512 is formed at a central portion of the flat surface 511, and in the elongated recess portion 512, the direction of an x axis which intersects a z axis, which is the axis of incident light, at right angles is referred to or defined as a longitudinal direction. The elongated recess portion 512 is curved inwards from the flat surface 511 to a rightward direction in FIG. 8A which is a direction in which incident light exits from the collimator lens 500. Additionally, a recessed edge 513 in a cross section which intersects the x axis at right angles is formed into an arc-like shape, and a recessed edge 514 in a cross section which is at right angles to a y axis is also formed into an arc-like shape.

In other words, the elongated recess portion 512 is formed as an ellipsoidal recess portion with the direction of the x axis defined as a major axis. The recessed edge 513 and the recessed edge 514 are formed so that their curvatures differ from each other. In this embodiment, the curvature of the recessed edge 513 is made greater than the curvature of the recessed edge 514.

The exit portion 530 is the same as the exit portion 430 of the first embodiment. Namely, as shown in FIGS. 8A and 8B which are side views of the collimator lens 500, the exit portion 530 is formed into a convex lens which is made convex to a rightward direction which is the exiting direction of incident light. Additionally, the exit portion 530 is formed so that a curvature of an arc 532 in a cross section which is at right angles to the x axis shown in FIG. 8A differs from a curvature of an arc 537 in a cross section which is at right angles to the y axis which is shown in FIG. 8B as intersecting the x axis at right angles. In other words, the convex lens portion on the exit portion 530 is formed as an aspheric lens. The portion of the exit portion 530 which is formed as the aspheric lens is formed so that light exiting from the exit portion 530 constitutes a parallel beam.

Laser rays from a red laser diode 121 and a blue laser diode 301 are caused to enter the elongated recess portion 512 of the entrance portion 510 of the collimator lens 500 in a similar way to that of the first embodiment so that the longitudinal direction of the elongated recess portion 512 coincides with the direction of a major axis (the direction of the x axis) of an elliptic cross section P. Then, the direction of a minor axis (the direction of the y axis) of the elliptic cross section P of the laser ray is expanded by the recessed edge 513. Further, the direction of the major axis (the direction of the x axis) of the elliptic cross section P is expanded by the recessed edge 514. The widths of the laser ray which are expanded by the recessed edges 513, 514 are made to be equal to each other at the exit portion 530. Consequently, the laser ray which is shone on to a microlens array 145 has a circular cross section.

In this way, in this embodiment, the width of the laser ray can be expanded not only in the direction of the x axis but also in the direction of the y axis. Consequently, the range of the laser ray which is shone on to the microlens array 145 can be expanded wider. Alternatively, the small laser ray emitting device can be provided which can emit a laser ray having a circular cross section of a predetermined diameter by reducing the distance between the red and blue laser diodes 121, 301 and the corresponding collimator lenses 500.

Third Embodiment

Figure 9A:
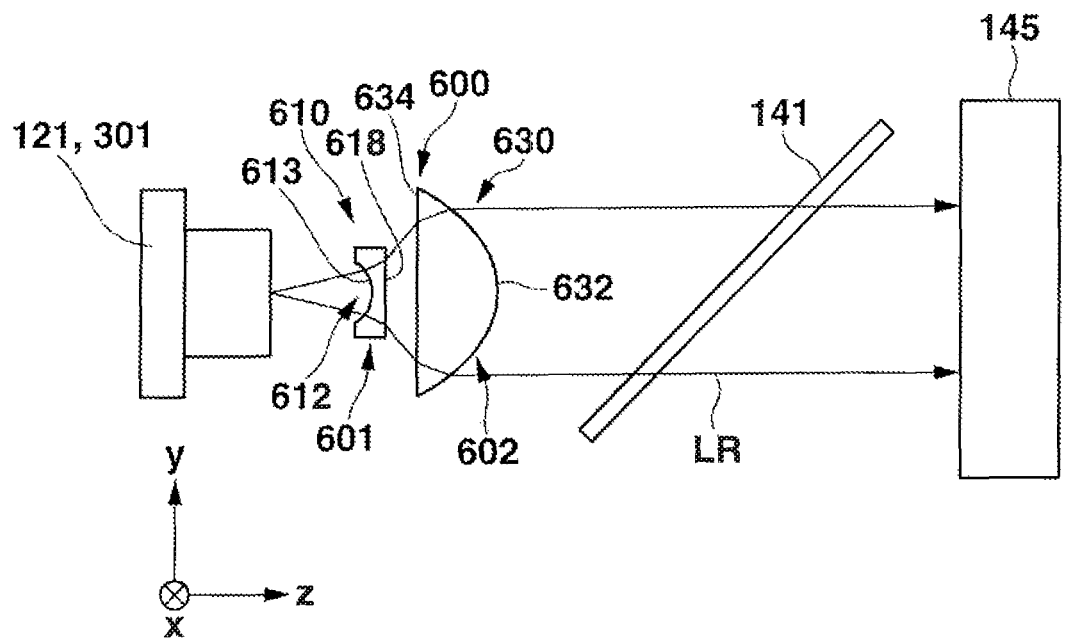
FIG. 9A is a schematic side view along a y-z plane of a laser diode, a collimator lens and other constituent elements according to a third embodiment of the invention which shows how light emitted from the laser diode is transmitted through the collimator lens.
Figure 9B:
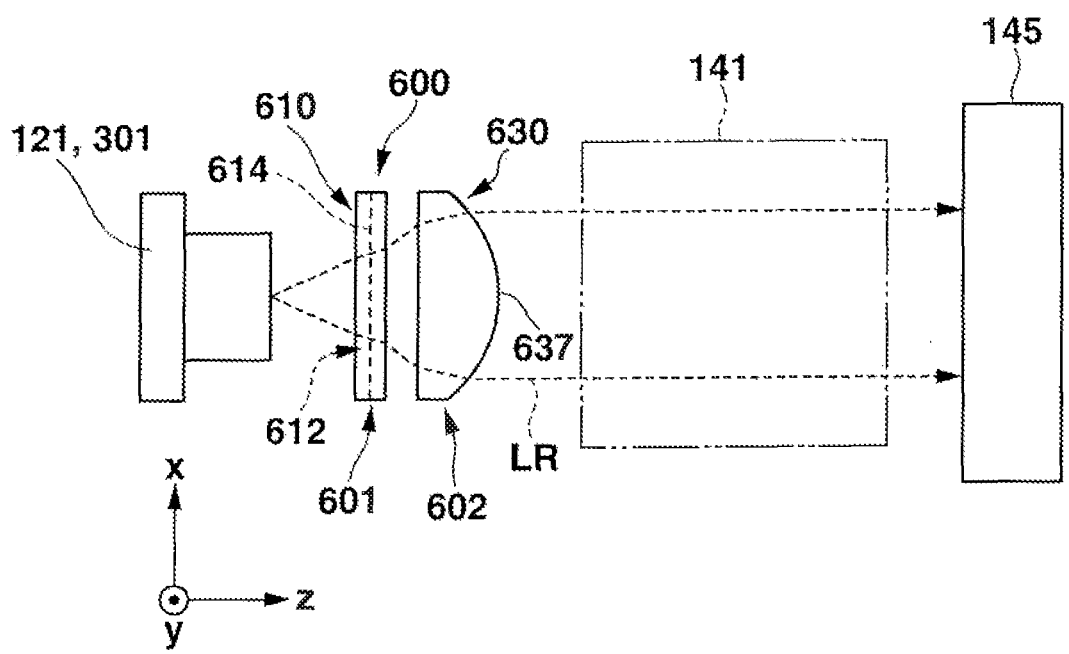
FIG. 9B is a schematic side view along an x-z plane of the laser diode, the collimator lens and the other constituent elements of the third embodiment of the invention which shows how the light emitted from the laser diode is transmitted through the collimator lens.

Next, a third embodiment according to the invention will be described based on FIGS. 9A and 9B. In this embodiment, the collimator lens 400 of the first embodiment is modified into a collimator lens 600 shown in FIGS. 9A and 9B. Consequently, the other portions else than this collimator lens 600 remain the same as those of the first embodiment, and therefore, like reference numerals will be given to like members or portions to those of the first embodiment, and the description thereof will be omitted here.

The collimator lens 600 is made up of a first lens member 601 which is disposed on a side which faces a red laser diode 121 or a blue laser diode 301 and a second lens member 602 which is disposed on a side which faces a microlens array 145. An overall shape of the first lens member 601 is formed into a box-like shape in which the direction of an x axis is defined as a longitudinal direction. The first lens member 601 has an entrance portion 610 which a laser ray is caused to enter, and this entrance portion 610 is formed on a side which faces the red laser diode 121 or the blue laser diode 301.

An elongated recess portion 612 is formed in the entrance portion 610 so as to be curved inwards towards the direction in which incident light is caused to exit with the direction of the x axis being defined as a longitudinal direction. A recessed edge 613 in a cross section which is at right angles to the x axis is formed into an arc shape, and a recessed edge 614 in a cross section which is at right angles to the y axis is formed into a straight line. In other words, the elongated recess portion 612 is formed into a cylindrical recess portion. An exit surface 618 which is a flat surface is formed on an opposite side of the first lens member 601 to the side where the entrance portion 610 is formed.

On the other hand, in the second lens member 602, a surface of a side which faces the first lens member 601 is formed flat, and this flat surface is formed as an entrance surface 634, while an exit portion 630 from which a laser ray exits is formed on an opposite side to the side where the entrance surface 634 is formed. The exit portion 630 is formed into a convex lens which projects convexly in a rightward direction which is a direction in which the laser ray, which has entered the second lens member 602 from the entrance surface 634, is caused to exit therefrom. Then, the second lens member 602 is formed so that a curvature of an arc 632 in a cross section, which intersects an x axis shown in FIG. 9A at right angles, differs from a curvature of an arc 637 in a cross section, which intersects at right angles a y axis which intersects an x axis at right angles in FIG. 9B. In other words, the convex lens portion of the exit portion 630 is formed as an aspheric lens. Then, the portion of the exit portion 630 which is formed as the aspheric lens is formed so that light which exits from the exit portion 630 becomes a parallel beam.

In the collimator lens 600 which is configured in the way described above, too, the cross section of the laser ray is shaped into a circular shape. Namely, the laser ray LR which enters the entrance portion 610 is expanded in width in the direction of the x axis by the recessed edge 613 of the elongated recess portion 612. The laser ray LR is expanded in width in the direction of the y axis by the refraction index which is attributed to the material of the first lens member 601. Then, the laser ray LR which exits from the exit surface 618 is expanded in width both in the direction of the x axis and in the direction of the y axis by an air layer defined between the first lens member 601 and the second lens member 602 and is then caused to enter the second lens member 602 from the entrance surface 634. Then, in the laser ray LR at the exit portion 630 of the second lens member 602, the width in the direction of the x axis and the width in the direction of the y axis become the same. Consequently, the laser ray LR which exits from the exit portion 630 is shaped into the circular shape in cross section.

In this way, since the air layer is interposed between the first lens member 601 and the second lens member 602 in the collimator lens 600, the width in the direction of the x axis and the width in the direction of the y axis of the laser ray LR can be expanded further while reducing the distance from the laser emitting device to the exit portion 630.

Although the elongated recess portion 612 of the third embodiment is formed as the cylindrical recess portion as with the elongated recess portion 412 of the first embodiment, the elongated recess portion 612 can also be formed as an ellipsoidal recess portion as with the elongated recess portion 512 of the second embodiment.

Thus, as has been described heretofore, the collimator lenses 400, 500, 600 according to the embodiments of the invention have the entrance portions 410, 510, 610 and the exit portions 430, 530, 630. In the entrance portions 410, 510, 610, the elongated recess portions 412, 512, 612 are formed in which the x axis, which is the first axis which intersects the axis z of incident light at right angles, is defined as the longitudinal direction and the cross section which intersects the x axis at right angles is formed into the arc shape. The exit portions 430, 530, 630 are formed so that the curvature of the cross section which intersects the x axis, which is the first axis, at right angles differs from the curvature of the cross section which intersects at right angles the y axis which is the second axis which intersects the x axis, which is the first axis, at right angles.

By adopting this configuration, the laser ray is allowed to enter the collimator lenses 400, 500, 600 with the direction of the major axis of the elliptic cross section of the laser ray being aligned with the first axis (the x axis), so that the width in the direction of the minor axis (the direction of the y axis which is referred to as the second axis) of the elliptic cross section of the laser ray is expanded to thereby change the elliptic cross-sectional shape of the laser ray to the circular cross-sectional shape. Additionally, the exit angle characteristics can be made symmetrical. Consequently, the collimator lenses 400, 500, 600 which can expand their shining ranges by shaping the cross section of the laser ray into the circular shape can be formed small in size, whereby it is possible not only to prevent the enlargement in size of the laser emitting device which includes any of the collimator lenses 400, 500, 600 but also to allow the laser ray to be shone uniformly over a wide range on the microlens array 145.

As shown in FIGS. 6A, 6B, 8A, 8B and 8C, the radius of the circle, which is defined to include as an arc-like curved portion thereof the elongated recess portions 412, 512, 612 (the direction of the y axis which is the direction of the second axis) which are situated on the side of the collimator lenses 400, 500, 600 where the entrance portions 410, 510, 610 are provided, is smaller than the distance between the exit surface of the laser diode (the red laser diode 121, the blue laser diode 301) which constitutes the distal end thereof and the flat surfaces 411, 511 of the entrance portions 410, 510, 610 of the collimator lenses 400, 500, 600.

Additionally, the radius of the circle, which is defined to include as an arc-like curved portion thereof the elongated recess portions 412, 512, 612 (the direction of the x axis which is the direction of the first axis) which are situated on the side of the collimator lenses 400, 500, 600 where the entrance portions 410, 510, 610 are provided, is greater than the distance between the exit surface of the laser diode (the red laser diode 121, the blue laser diode 301) and the flat surfaces 411, 511 of the entrance portions 410, 510, 610 of the collimator lenses 400, 500, 600.

Namely, the curvature in the direction y of the cross section which intersects at right angles the x axis which is the first axis which intersects the axis z of incident light at right angles is greater than the curvature in the direction x of the cross section which intersects the y axis, which is referred to as the second axis, at right angles.

In addition, the exit portions 430, 530, 630 are formed so that the exit angle relative to the axis of light which exits therefrom becomes the same in the direction of the x axis which is the first axis and in the direction of the y axis which is the second axis. This makes the cross-sectional shape of light which exits from the exit portions 430, 530, 630 circular irrespective of the distance from the collimator lenses 400, 500, 600.

In the elongated recess portions 412, 612, the recessed edges 414, 614 in the cross section which intersects the y axis, which is the second axis, at right angles are formed into the straight line. Since this enables the elongated recess portions 412, 612 to be formed into the cylindrical recess portion, the collimator lenses 400, 600 can easily be produced.

Additionally, the elongated recess portion 512 is formed so that the recessed edge 514 in the cross section which intersects the y axis, which is the second axis, at right angles is formed into the arc shape and that the curvature of the recessed edge 514 and the curvature of the recessed edge 513 differ from each other. According to this configuration, in the laser ray that enters the elongated recess portion 512, not only the width in the direction of the major axis which is the direction of the first axis (the x axis) but also the width in the direction of the minor axis which is the direction of the second axis (the y axis) can be expanded. Consequently, the laser ray can be shone over the wider range.

In addition, the collimator lens 600 is made up of the first lens member 601 having the entrance portion 610 and the second lens member 602 having the exit portion 630. This enables the air layer to be defined between the first lens member 601 and the second lens member 602. Consequently, it is possible to provide the collimator lens 600 which is short in the direction of the axis of light which exit therefrom, that is, the direction of the z axis and which is suitable for a reduction in size of the light source device, while allowing a further expansion of the shining range of the laser ray.

Additionally, the light source unit 60 includes the collimator lenses 400, 500, 600 and the laser diodes 121, 301. Then, the laser diodes 121, 301 are disposed so that the direction of the major axis of the elliptic cross section of the laser ray which is emitted from the laser diode is aligned with the elongated recess portions 412, 512, 612 of the collimator lenses 400, 500, 600. This enables the provision of the light source unit 60 which includes the collimator lenses 400, 500, 600 which are reduced in size, while allowing the expansion of the shining range of the laser ray.

The light source unit 60 includes the microlens array 145 on to which light is shone from the collimator lenses 400, 500, 600. Consequently, since the laser ray having the circular cross section where the shining range of the laser ray is expanded is shone on to the microlens array 145, the laser ray is allowed to pass through a larger number of microscopic lenses. Thus, the light source unit 60 can emit light source light whose intensity distribution is uniform.

The light source unit 60 includes the red laser diode 121 and the blue laser 301. This enables the laser rays which are emitted from the red laser diode 121 and the blue laser diode 301 to be shaped so that the cross section of the laser ray becomes circular and that the exit angles relative to the axis of the laser ray which exits become symmetrical axially, whereby the light source unit 60 can be obtained which expands the shining range of the laser ray while reducing the size thereof.

The light source unit 60 includes further the green light source device 80 which emits luminescent light in the green wavelength range in addition to the red laser diode 121 and the blue laser diode 301. Thus, the light source unit 60 can be obtained which includes the light sources of the three primary colors of red, green and blue.

The light source unit 60 includes further the microlens array 145, and light in the green wavelength range is also transmitted through the microlens array 145. This enables all the laser rays and the luminescent light which are shone on to the microlens array 145 to have the circular cross sections, whereby the design conditions of the optical systems which are positioned in front of and behind the microlens array 145 become clear, thereby making it possible to provide the light source unit 60 in which the configurations of the optical systems become simple and easy.

The projector 10 includes the light source unit 60, the display device 51, the projection side optical system 220 and the projector control unit. Since this enables the laser rays from the bright laser diodes 121, 301 to have the uniform intensity distribution, unevenness in color and unevenness in illuminance is reduced, whereby the projector 10 can be obtained which can project a clear projection image.

Thus, the embodiments which have been described heretofore are presented as the examples, and hence, there is no intention to limit the spirit and scope of the invention by those embodiments. These novel embodiments can be carried out in other various forms, and various omissions, replacements and alterations can be made without departing from the spirit and scope of the invention. These embodiments and their modifications are included in the scope and gist of the invention, as well as in the scope of inventions set forth in claims and their equivalents.

What is claimed is:

1. A light source unit comprising:
    a laser diode which emits light having an elliptic cross section; and
    a collimator lens including an entrance portion and an exit portion;
    wherein the light emitted from the laser diode is incident light which is caused to enter the collimator lens, and the laser diode is disposed so that a direction of a major axis of the elliptic cross section which intersects an axis of the incident light at right angles is defined as a direction of a first axis;
    wherein the entrance portion includes an elongated recess portion which is formed into a recess shape which is curved inwards towards a direction in which the incident light exits, and a recessed edge of the elongated recess portion in a cross section, which intersects the first axis at right angles, is formed into an arc shape;
    wherein the incident light which enters the entrance portion is caused to exit from the exit portion which is formed into a convex shape; and
    wherein light exiting from the exit portion of the collimator lens is shone onto and is transmitted through a microlens array.

2. The light source unit according to claim 1, wherein the exit portion is formed so that a curvature of an arc-shaped edge portion in the cross section which intersects the first axis at right angles differs from a curvature of an arc-shaped edge portion in a cross section which intersects at right angles a second axis which intersects the axis of the incident light and the first axis at right angles.

3. The light source unit according to claim 2, wherein the exit portion is formed so that angles at which light is caused to exit from the exit portion in the direction of the first axis and the direction of the second axis are the same.

4. The light source unit according claim 2, wherein the elongated recess portion is formed so that the recessed edge in a cross section which intersects the second axis at right angles is formed into a straight line.

5. The light source unit according to claim 2, wherein the elongated recess portion is formed so that a curvature of a recessed edge in a cross section which intersects the first axis at right angles differs from a curvature of the recessed edge in a cross section which intersects the second axis at right angles.

6. The light source unit according to claim 4, wherein the elongated recess portion is formed so that a curvature of a recessed edge in a cross section which intersects the first axis at right angles differs from a curvature of the recessed edge in the cross section which intersects the second axis at right angles.

7. The light source unit according to claim 2, wherein the collimator comprises:
    a first lens member having the entrance portion and an exit surface from which the incident light which is caused to enter the entrance portion is caused to exit and which is formed as a flat surface; and
    a second lens member having the exit portion and an entrance surface which light exiting from the exit surface is caused to enter and which is formed as a flat surface.

8. The light source unit according to claim 2, wherein:
    a radius of a circle which is defined to include as an arc-like curved portion thereof the direction of the second axis of the elongated recess portion which is formed in the entrance portion of the collimator lens is smaller than a distance between an exit surface of the laser diode and a flat surface of the entrance portion of the collimator lens; and
    a radius of a circle which is defined to include as an arc-like curved portion thereof the direction of the first axis of the elongated recess portion which is formed in the entrance portion of the collimator lens is greater than a distance between an exit surface of the laser diode and a flat surface of the entrance portion of the collimator lens.

9. The light source unit according to claim 2, wherein a curvature in the direction of the second axis of the arc-shaped edge portion of the exit portion of the collimator lens is greater than a curvature in the direction of the first axis of the arc-shaped edge portion of the exit portion of the collimator lens.

10. The light source unit according to claim 1, wherein a plurality of laser diodes are provided, including at least a red laser diode which emits light in a red wavelength range and a blue laser diode which emits light in a blue wavelength range.

11. The light source unit according to claim 10, further comprising:
    a green light source device comprising a luminescent plate having a luminescent light emitting area onto which excitation light from an excitation light source is shone to emit luminescent light in a green wavelength range.

12. The light source unit according to claim 11, wherein light emitted from the green light source device is shone onto and is transmitted through the microlens array.

13. A projector comprising:
the light source unit according to claim 1;
a display device onto which light source light from the light source unit is shone to form image light;
a projection side optical system which projects the image light emitted from the display device onto a screen; and
a projector control unit which controls the display device and the light source unit.

14. A light source unit comprising:
a laser diode which emits light having an elliptic cross section; and
a collimator lens including an entrance portion and an exit portion;
wherein the light emitted from the laser diode is incident light which is caused to enter the collimator lens, and the laser diode is disposed so that a direction of a major axis of the elliptic cross section which intersects an axis of the incident light at right angles is defined as a direction of a first axis;
wherein the entrance portion includes an elongated recess portion which is formed into a recess shape which is curved inwards towards a direction in which the incident light exits, and a recessed edge of the elongated recess portion in a cross section, which intersects the first axis at right angles, is formed into an arc shape;
wherein the incident light which enters the entrance portion is caused to exit from the exit portion which is formed into a convex shape;
wherein the exit portion is formed so that a curvature of an arc-shaped edge portion in the cross section which intersects the first axis at right angles differs from a curvature of an arc-shaped edge portion in a cross section which intersects at right angles a second axis which intersects the axis of the incident light and the first axis at right angles; and
wherein the collimator comprises:
a first lens member having the entrance portion and an exit surface from which the incident light which is caused to enter the entrance portion is caused to exit and which is formed as a flat surface; and
a second lens member having the exit portion and an entrance surface which light exiting from the exit surface is caused to enter and which is formed as a flat surface.

15. A light source unit comprising:
a laser diode which emits light having an elliptic cross section; and
a collimator lens including an entrance portion and an exit portion;
wherein the light emitted from the laser diode is incident light which is caused to enter the collimator lens, and the laser diode is disposed so that a direction of a major axis of the elliptic cross section which intersects an axis of the incident light at right angles is defined as a direction of a first axis;
wherein the entrance portion includes an elongated recess portion which is formed into a recess shape which is curved inwards towards a direction in which the incident light exits, and a recessed edge of the elongated recess portion in a cross section, which intersects the first axis at right angles, is formed into an arc shape;
wherein the incident light which enters the entrance portion is caused to exit from the exit portion which is formed into a convex shape;
wherein the exit portion is formed so that a curvature of an arc-shaped edge portion in the cross section which intersects the first axis at right angles differs from a curvature of an arc-shaped edge portion in a cross section which intersects at right angles a second axis which intersects the axis of the incident light and the first axis at right angles;
wherein a radius of a circle which is defined to include as an arc-like curved portion thereof the direction of the second axis of the elongated recess portion which is formed in the entrance portion of the collimator lens is smaller than a distance between an exit surface of the laser diode and a flat surface of the entrance portion of the collimator lens; and
wherein a radius of a circle which is defined to include as an arc-like curved portion thereof the direction of the first axis of the elongated recess portion which is formed in the entrance portion of the collimator lens is greater than a distance between an exit surface of the laser diode and a flat surface of the entrance portion of the collimator lens.

16. A light source unit comprising:
a laser diode which emits light having an elliptic cross section; and
a collimator lens including an entrance portion and an exit portion;
wherein the light emitted from the laser diode is incident light which is caused to enter the collimator lens, and the laser diode is disposed so that a direction of a major axis of the elliptic cross section which intersects an axis of the incident light at right angles is defined as a direction of a first axis;
wherein the entrance portion includes an elongated recess portion which is formed into a recess shape which is curved inwards towards a direction in which the incident light exits, and a recessed edge of the elongated recess portion in a cross section, which intersects the first axis at right angles, is formed into an arc shape;
wherein the incident light which enters the entrance portion is caused to exit from the exit portion which is formed into a convex shape;
wherein the exit portion is formed so that a curvature of an arc-shaped edge portion in the cross section which intersects the first axis at right angles differs from a curvature of an arc-shaped edge portion in a cross section which intersects at right angles a second axis which intersects the axis of the incident light and the first axis at right angles; and
wherein a curvature in the direction of the second axis of the arc-shaped edge portion of the exit portion of the collimator lens is greater than a curvature in the direction of the first axis of the arc-like curved portion of the exit portion of the collimator lens.

17. A projector comprising:
a light source unit which comprises:
a laser diode which emits light having an elliptic cross section; and
a collimator lens including an entrance portion and an exit portion;
wherein the light emitted from the laser diode is incident light which is caused to enter the collimator lens, and the laser diode is disposed so that a direction of a major axis of the elliptic cross section which intersects an axis of the incident light at right angles is defined as a direction of a first axis;
wherein the entrance portion includes an elongated recess portion which is formed into a recess shape which is curved inwards towards a direction in which the incident light exits, and a recessed edge of the elongated recess portion in a cross section, which intersects the first axis at right angles, is formed into an arc shape; and wherein the incident light which enters the entrance portion is caused to exit from the exit portion which is formed into a convex shape;

a display device onto which light source light from the light source unit is shone to form image light;

a projection side optical system which projects the image light emitted from the display device onto a screen; and a projector control unit which controls the display device and the light source unit.

\* \* \* \* \*

UNITED STATES PATENT AND TRADEMARK OFFICE
CERTIFICATE OF CORRECTION

PATENT NO. : 9,800,847 B2
APPLICATION NO. : 14/812185
DATED : October 24, 2017
INVENTOR(S) : Hideyuki Kurosaki It is certified that error appears in the above-identified patent and that said Letters Patent is hereby corrected as shown below:

In the Claims

Column 16, Line 3, Claim 4 after "according" insert -- to --.

Signed and Sealed this
Sixteenth Day of January, 2018

Joseph Matal
*Performing the Functions and Duties of the
Under Secretary of Commerce for Intellectual Property and
Director of the United States Patent and Trademark Office*